(12) United States Patent
Rossini

(10) Patent No.: US 7,076,810 B1
(45) Date of Patent: Jul. 18, 2006

(54) MULTIPURPOSE BOONIE HAT

(76) Inventor: Michael J. Rossini, 169 Everett St., Apt. 3, Quincy, MA (US) 02169

( * ) Notice: Subject to any disclaimer, the term of this patent is extended or adjusted under 35 U.S.C. 154(b) by 23 days.

(21) Appl. No.: 10/909,016

(22) Filed: Aug. 2, 2004

(51) Int. Cl.
A42B 1/20 (2006.01)
A42B 1/00 (2006.01)
A42C 5/04 (2006.01)

(52) U.S. Cl. .................. 2/171.1; 2/171.5; 2/207; 2/175.1; 2/900

(58) Field of Classification Search ............. 2/10, 2/12, 171.1, 171.5, 205, 207, 175.1, 900, 2/175.6, 908, 909, 918; 429/919
See application file for complete search history.

(56) References Cited

U.S. PATENT DOCUMENTS

| | | | |
|---|---|---|---|
| 336,712 A * | 2/1886 | Garst | 2/4 |
| 876,452 A | 1/1908 | Harrison et al. | |
| 1,780,801 A * | 11/1930 | Shlenker | 2/4 |
| 1,869,652 A | 8/1932 | Baker | |
| 2,295,826 A * | 9/1942 | Brav | 2/172 |
| 2,349,471 A | 5/1944 | Starbeck | |
| 2,367,006 A * | 1/1945 | Cope | 2/4 |
| 2,472,033 A | 5/1949 | Wetzel | |
| 2,615,168 A | 10/1952 | Tannenbaum | |
| 2,744,256 A | 5/1956 | Slotkin et al. | |
| 2,856,607 A | 10/1958 | Richardson | |
| 3,505,682 A | 4/1970 | Mims | |
| 4,214,318 A * | 7/1980 | Gomez | 2/4 |
| 4,397,044 A | 8/1983 | Trepanier | |
| 4,472,837 A | 9/1984 | Saxton | |
| 4,887,316 A | 12/1989 | Morandini | |
| 5,035,004 A | 7/1991 | Koester | |
| 5,091,993 A | 3/1992 | Merrill et al. | |
| 5,153,943 A | 10/1992 | Clement | |
| 5,159,720 A * | 11/1992 | Scott, Jr. | 2/171 |
| 5,226,189 A | 7/1993 | Blutstein | |
| D346,893 S * | 5/1994 | St-Germain | D2/866 |
| 5,355,535 A | 10/1994 | Bruder | |
| 5,448,778 A | 9/1995 | Phillips | |
| 5,542,127 A | 8/1996 | Bezanis | |
| 5,577,271 A | 11/1996 | Davis | |
| 5,649,327 A * | 7/1997 | Crewe | 2/172 |
| 5,713,076 A | 2/1998 | Davis | |
| 5,713,077 A | 2/1998 | Humbrecht | |
| 5,790,986 A * | 8/1998 | Hall | 2/172 |
| 5,887,287 A | 3/1999 | Potochnik | |
| 5,924,129 A | 7/1999 | Gill | |
| 5,933,869 A | 8/1999 | Allen | |
| 5,950,241 A | 9/1999 | Gomez | |
| 5,996,124 A | 12/1999 | Asp, Jr. | |
| 6,023,788 A | 2/2000 | McCallum et al. | |
| 6,049,904 A | 4/2000 | Siracusa | |
| 6,131,201 A | 10/2000 | Chu | |
| 6,151,712 A | 11/2000 | Lampi | |
| 6,230,331 B1 * | 5/2001 | Aguilar et al. | 2/209.11 |
| 6,233,738 B1 * | 5/2001 | Siracusa | 2/4 |
| 6,256,794 B1 | 7/2001 | Erickson | |
| 6,256,796 B1 * | 7/2001 | Fleming | 2/209.13 |
| 2004/0209051 A1 * | 10/2004 | Santos et al. | 428/195.1 |
| 2005/0086723 A1 * | 4/2005 | Hsieh | 2/173 |

* cited by examiner

Primary Examiner—Rodney M. Lindsey
(74) Attorney, Agent, or Firm—John P. McGonagle

(57) ABSTRACT

A hat made from a camouflage-imprinted material and having a crown and a brim. The hat has a compartment in the crown for holding a bundle of camouflage strips attached to the crown and which are deployable about and over the hat brim upon opening the compartment. The hat also has a net storing feature for storing a lightweight camouflage netting about the crown on top of the brim. The net is deployable over the brim about the wearer's face, neck and shoulders.

5 Claims, 4 Drawing Sheets

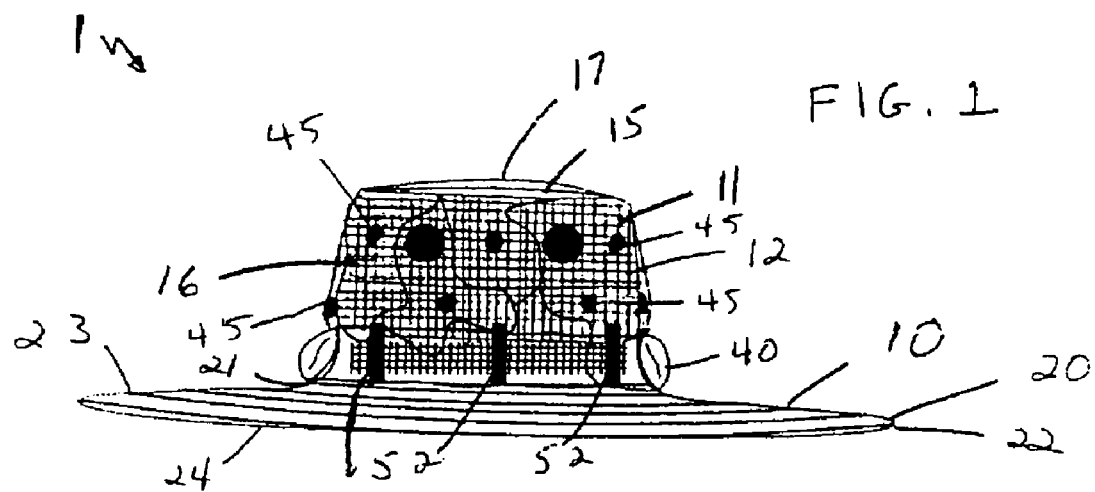
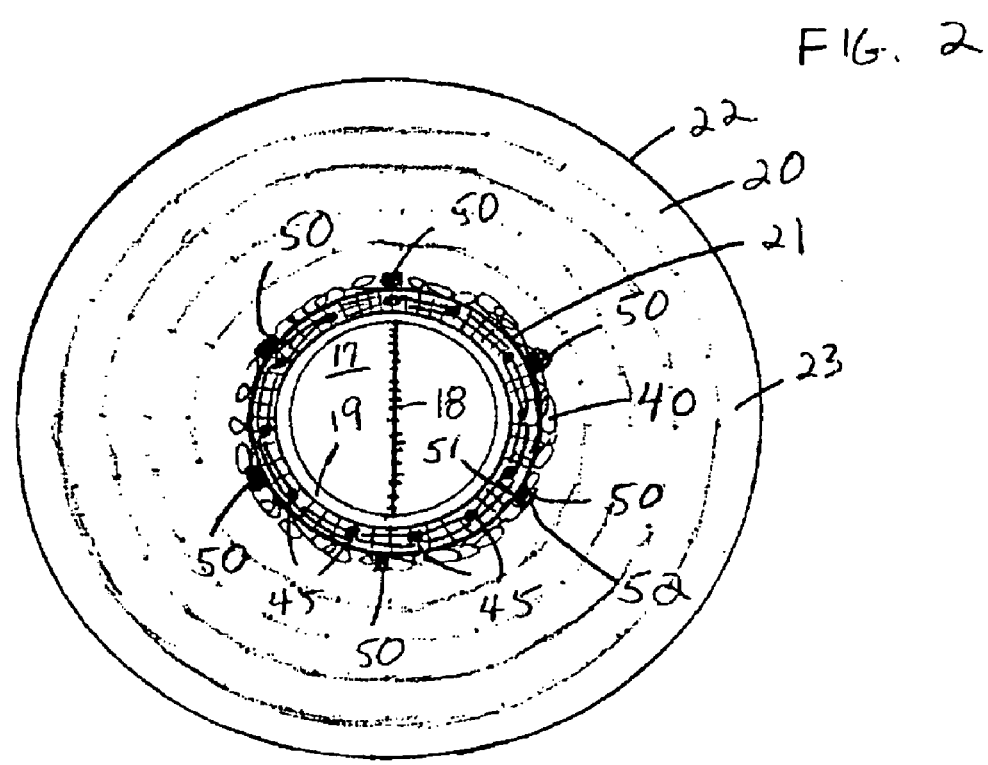

MULTIPURPOSE BOONIE HAT

BACKGROUND OF THE INVENTION

This invention relates to hats, and in particular to an enhanced hot weather hat adapted for military applications.

Military personnel are typically provided with camouflaged hot weather "boonie" hats for certain types of deployments. These types of hats are generally made from a camouflage imprinted material. These hats are designed to protect the head and neck of the wearer from exposure as well as provide some basic camouflage consistent with the soldiers clothing. These hats have had little change through the years and offer little additional benefit to the wearer other than the basic purpose of providing some protection from the elements and some very basic camouflage.

SUMMARY OF THE INVENTION

In accordance with the present invention, a hat made from a camouflage-imprinted material is provided which has a crown and a brim. The hat has a compartment in the crown for holding a bundle of camouflage strips attached to the crown and which are deployable about and over the hat brim upon opening the compartment. In a deployed state, the camouflage strips extend downward over the hat crown and brim. The hat also has a net storing feature for storing a lightweight camouflage netting about the crown on top of the brim. Upon releasing of the net storing feature, the netting is deployed over the brim about the wearer's face, neck and shoulders, thereby camouflaging the wearer's upper torso while also providing bug protection. Thus, three-dimensional camouflage is available in addition to the normal element protective features of the hat.

Therefore, it is a primary object and feature of the present invention to leverage the positive protection benefits of the boonie hot weather hat, while adding additional protective features making the hat a multipurpose head and neck protection and concealment system.

It is a further object and feature of the present invention to provide a hat enabling the soldier-wearer to rapidly employ lightweight three-dimensional camouflage that will quickly render the soldier's upper head and torso an indistinguishable form.

It is still a further object and feature of the present invention to provide a hat enabling the soldier to rapidly employ a lightweight camouflage netting that will readily offer additional exposure protection while offering increased glare reduction, insect protection and concealment of the head, face and neck.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

FIG. 1 is a side view of a hat constructed according to the principles of the present invention with camouflage strips and netting stowed.

FIG. 2 is a top view thereof.

DETAILED DESCRIPTION OF THE INVENTION

Figure 3:
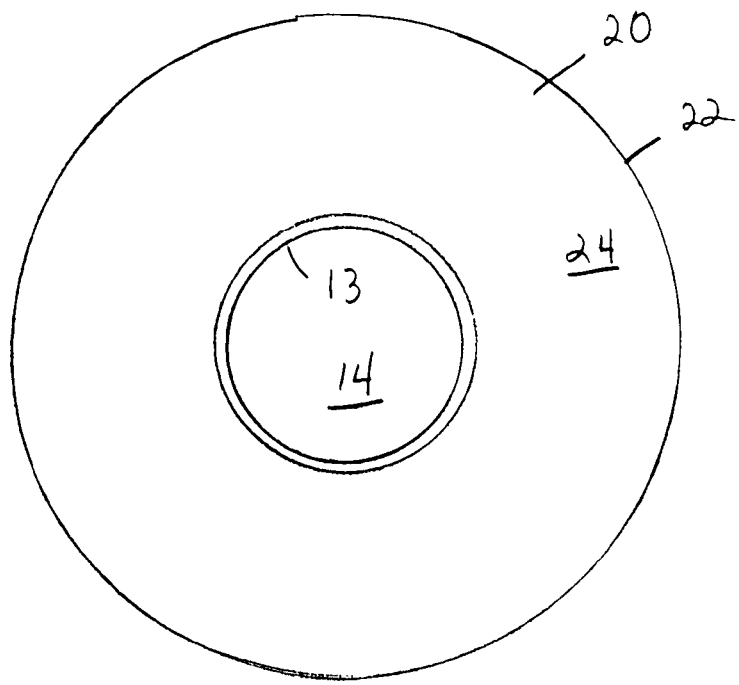
FIG. 3 is a bottom view thereof.
Figure 4:
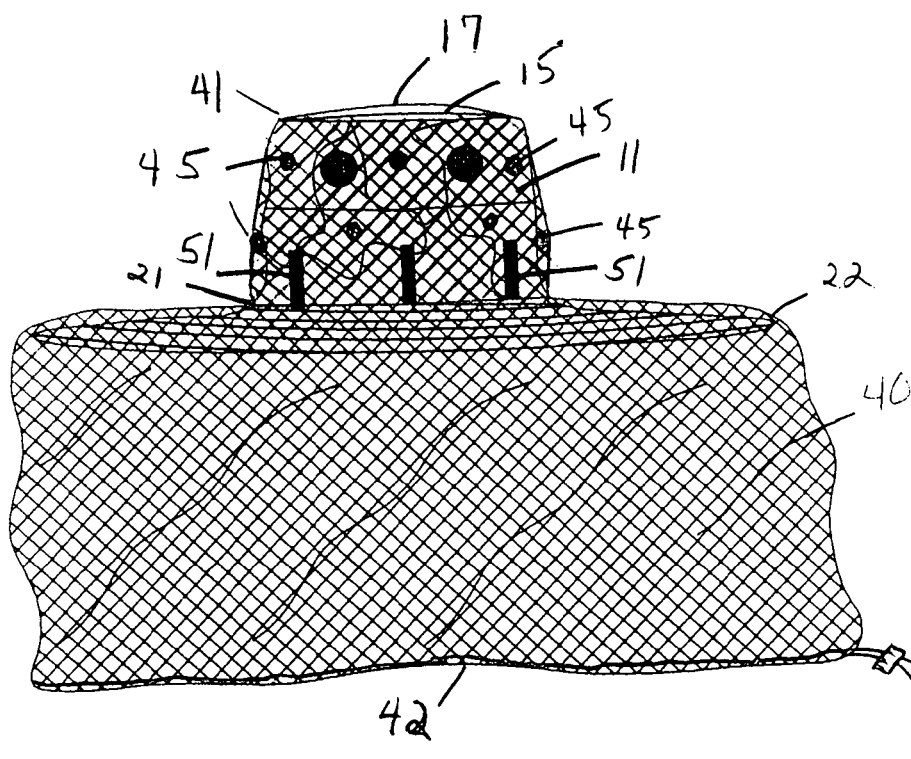
FIG. 4 is a side view of the invention hat with netting deployed.
Figure 5:
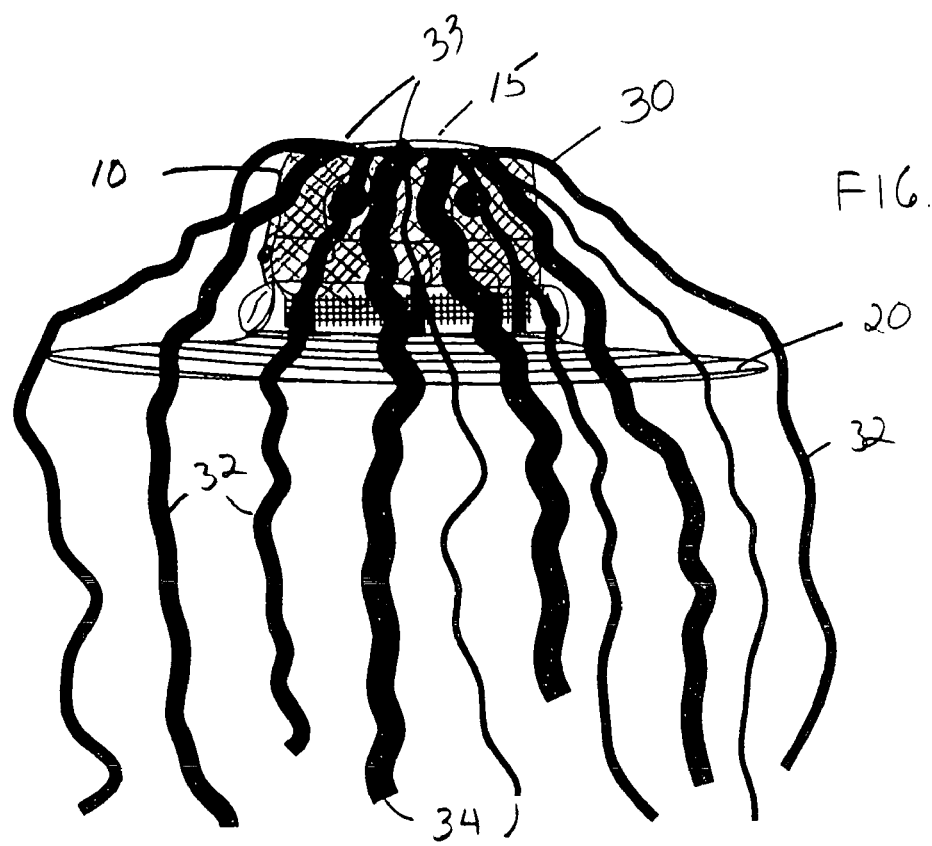
FIG. 5 is a side view of the invention hat with camouflage strips deployed.
Figure 6:
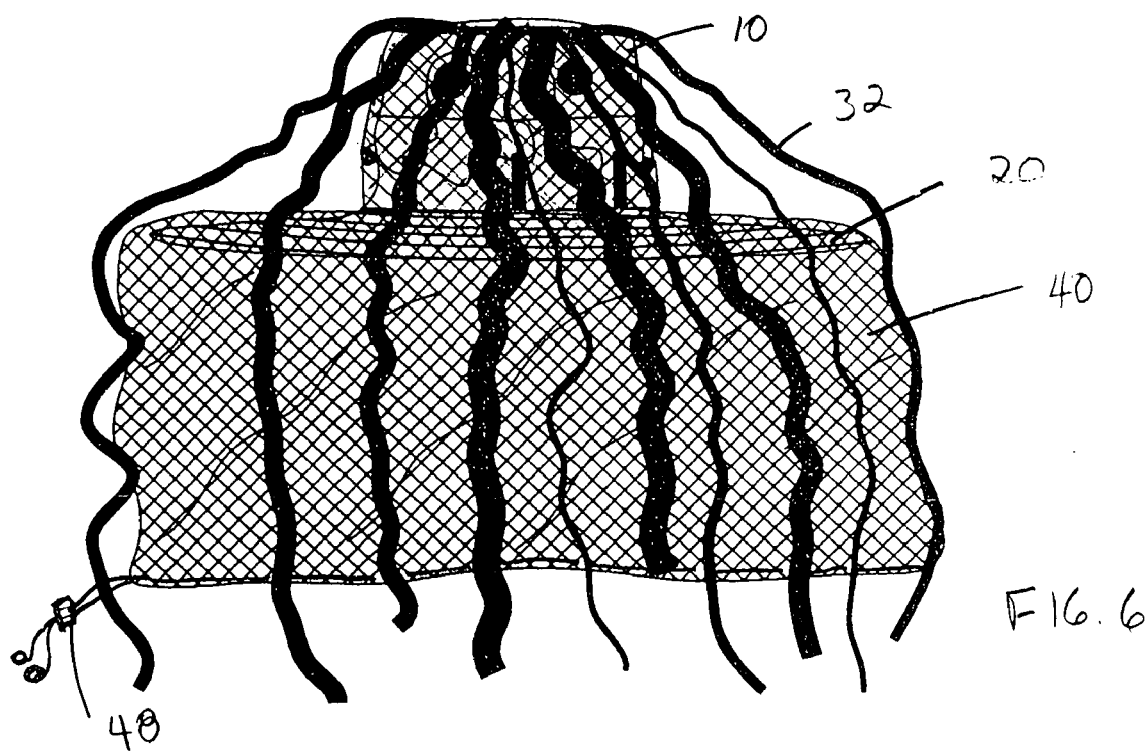
FIG. 6 is a side view of the invention hat with both netting and camouflage strips deployed.
Figure 7:
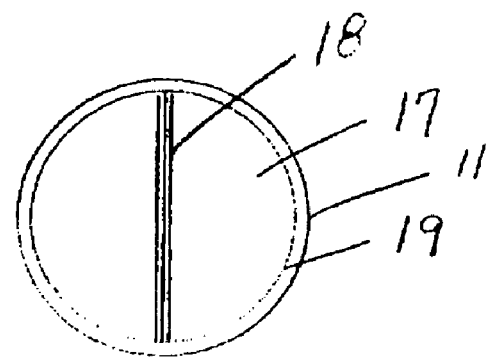
FIG. 7 is a top view of the hat crown with top cover closed.
Figure 8:
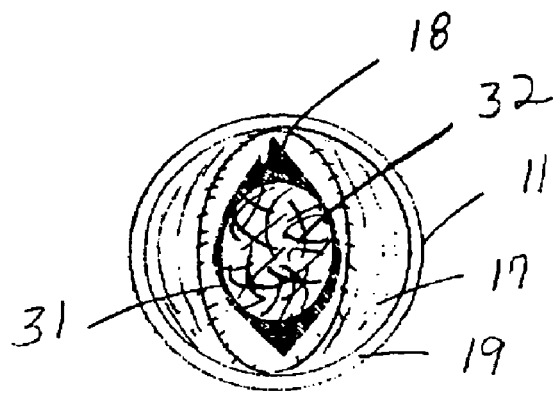
FIG. 8 is a top view of the hat crown with top cover partially open.
Figure 9:
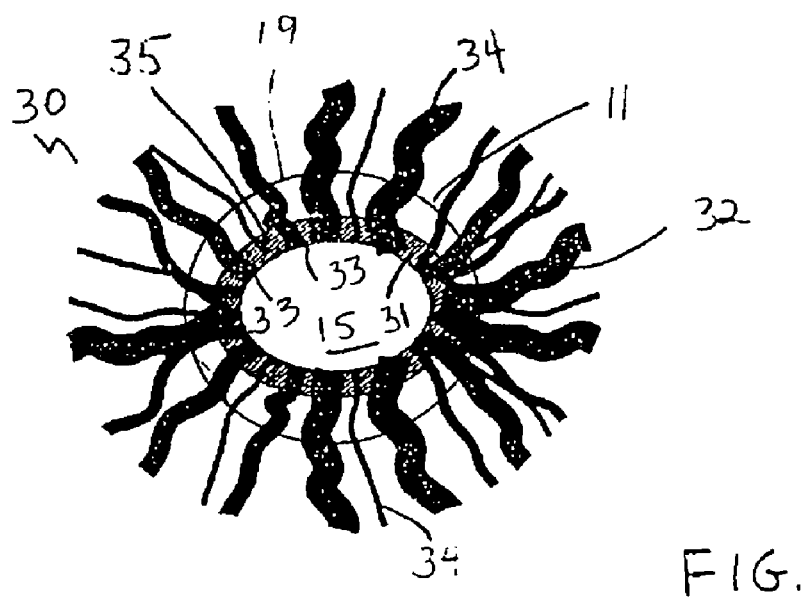
FIG. 9 is a top view of the hat crown with camouflage bundle deployed.

Referring to the drawings in detail wherein like elements are indicated by like numerals, there is shown an enhanced multipurpose boonie hat 1 constructed according to the principles of the present invention. The invention is comprised of a hat 10 having a crown 11 with an outer surface 12 and an interior surface 13. The crown interior surface 13 defines a cavity 14 for receiving a wearer's head. The crown 11 includes a top 15 and a generally cylindrical side wall 16 beginning at the top 15 and extending downward and terminating at a brim 20 extending radially outward from the hat crown 11. The hat brim 20 has an inner periphery 21 joined to the crown side wall 16 and an outer periphery 22 defining the outermost radial portion of the brim 20. The brim 20 has an top surface 23 and a bottom surface 24, said hat crown 11 rising from the brim top surface 23 and said cavity 14 rising from the brim bottom surface 24.

The hat crown 11 includes an optional top compartment 17 connected about its perimeter 19 to the crown top 15. The top compartment 17 has a central opening 18 closable means of a zipper, hook and pile fasteners such as are sold under the brand name VELCRO, or the like, so that the top compartment central opening 18 may be opened or closed as the wearer may desire.

The present invention also provides a bundle 30 of elongated camouflage strips 32 which, in an undeployed state, are stored within the top compartment 17. In a preferred embodiment, a piece 35 of Velcro material is fixedly attached to the crown top 15, regardless of whether or not a top compartment 17 is used. The bundle 30 is comprised of a fabric ring 31, either circular or elliptical in shape, with a multiplicity of elongated camouflage members 32 extending from the fabric ring 31, the members 32 being comprised of a variety of materials, lengths and colors. The ring 31 is removably attached to the Velcro piece 35 on the crown top 15. If a top compartment is used, the bundle 30 would be positioned within the top compartment 17 until the top compartment is opened. Each camouflage strip 32 has a first end 33 and a second end 34. Each strip first end 33 is attached to the ring 31. Each strip second end 34 is free and unattached. When the top compartment 17 is opened, the strips 32 are adapted to being hung from the ring 31 out over the hat crown side wall 16 and brim outer periphery 22.

To camouflage the wearer's face, and provide bug protection, a deployable face and bug net 40 is attached to the invention hat crown top 11 and brim top surface 23 at the crown outer surface 12. The net 40 may be deployed with or without camouflage bundle deployment. The net 40 is an "over the brim" design with an upper opening 41, wide enough to fit over the hat crown 11 but not wide enough to fit over the brim outer periphery 22, and a lower opening 42 wide enough to fit over the brim outer periphery 22. In an undeployed state, the net 40 is formed into a roll resting on the brim top surface 23 near to the brim inner periphery 21 as shown in FIG. 1. A number of hook and loop fasteners 50 hold the rolled net 40 against the hat crown 11. Each fastener 50 is comprised of a vertical strip 51 fixedly attached to the crown 11 and a corresponding strip 52 holding the rolled net to the first strip 51. Upon the release of the second strip 52 from the first strip 51, the net 40 may be unrolled and deployed over the brim outer periphery 22 down over the face, neck and shoulders of the wearer.

In a preferred embodiment of the invention, standoffs 45 are attached to the hat crown outer surface 12 beneath the net 40. The standoffs 45 may be made from a soft textile material and may be attached to the crown outer surface 12 with Velcro patches. The inventor has found that the net protection over the hat crown 11 is far more effective by keeping the net 40 from direct contact with the crown side wall 16 thereby creating an insect barrier away from the hat crown 11 itself, while still protecting the head beneath the crown. In a preferred embodiment of the invention an adjustable cinch and draw string 48 is attached about the perimeter of the net lower opening 42. The draw string 48 permits the wearer to seal off the lower opening 42 about the wearer's upper torso and prevent bugs from entering the net interior.

It is understood that the above-described embodiment is merely illustrative of the application. Other embodiments may be readily devised by those skilled in the art which will embody the principles of the invention and fall within the spirit and scope thereof.

I claim:

1. A multipurpose boonie hat, comprising:
    a crown and a brim, said hat being made from a camouflage-imprinted material, wherein said crown has an outer surface and an interior surface, said crown interior surface defining a cavity for receiving a wearer's head, said crown having a top and a generally cylindrical side wall beginning at the top and extending downward and terminating at said brim, wherein said brim extends radially outward from the hat crown and has an inner periphery joined to the crown side wall and an outer periphery defining an outermost radial portion of the brim, said brim having a top surface and a bottom surface, wherein said hat crown rises from the brim top surface and said cavity rises from the brim bottom surface;
    a compartment having a perimeter connected to the crown top, said compartment having a central opening closable by means of a fastener;
    a bundle of camouflage strips removably attached to said crown, wherein said bundle of camouflage strips is contained within said compartment, each said camouflage strip having a first end attached within said compartment and a second unattached free end, said strips adapted to being hung from the compartment out over the hat crown side wall and brim outer periphery; and
    a deployable face and bug net removably attached to said hat.

2. A multipurpose boonie hat as recited in claim 1, wherein:
    said deployable face and bug net is attached to the crown top and the brim top surface at the crown outer surface, said net having a lower central opening with a diameter greater than a brim outer periphery diameter.

3. A multipurpose boonie hat as recited in claim 2, further comprising:
    a plurality of fasteners attached to said crown outer surface, said fasteners adapted to hold the net formed into a roll resting on the brim top surface near to the brim inner periphery against the crown outer surface.

4. A multipurpose boonie hat as recited in claim 3, further comprising:
    a plurality of standoffs attached to the crown outer surface beneath the net, said standoffs adapted to keep the net from direct contact with the crown side wall.

5. A multipurpose boonie hat as recited in claim 4, further comprising:
    an adjustable cinch and draw string attached about the net lower central opening.

* * * * *